(12) United States Patent
Vergne et al.

(10) Patent No.: US 9,120,297 B2
(45) Date of Patent: Sep. 1, 2015

(54) METHOD FOR COATING A CORE OF AN ARBITRARY SHAPE BY THERMOFORMING, AUTOMATIC MACHINE FOR THE IMPLEMENTATION THEREOF AND FINISHED PRODUCT OBTAINED BY SUCH A METHOD

(75) Inventors: Pascal Vergne, Vieux Boucau (FR); Pierre Cazadieu, Soustons (FR)

(73) Assignee: NEWTIS, Vieux Boucau (FR)

( * ) Notice: Subject to any disclaimer, the term of this patent is extended or adjusted under 35 U.S.C. 154(b) by 0 days.

(21) Appl. No.: 13/637,288

(22) PCT Filed: Mar. 28, 2011

(86) PCT No.: PCT/FR2011/000186
§ 371 (c)(1),
(2), (4) Date: Nov. 23, 2012

(87) PCT Pub. No.: WO2011/117487
PCT Pub. Date: Sep. 29, 2011

(65) Prior Publication Data

US 2013/0078410 A1    Mar. 28, 2013

(30) Foreign Application Priority Data

Mar. 26, 2010   (FR) ...................... 10 01231

(51) Int. Cl.
*B29C 65/00* (2006.01)
*B32B 37/00* (2006.01)
(Continued)

(52) U.S. Cl.
CPC ............ *B32B 37/1018* (2013.01); *B29C 51/16* (2013.01); *B29C 51/28* (2013.01); *B29C 63/04* (2013.01); *B32B 3/04* (2013.01); *B29C 51/10* (2013.01); *B29C 2791/006* (2013.01); *B29L 2031/5272* (2013.01); *Y10T 156/103* (2015.01); *Y10T 428/19* (2015.01)

(58) Field of Classification Search
CPC B29C 63/00; B29C 63/0026; B29C 63/0065; B29C 63/0073; B29C 63/0091; B29C 63/02; B29C 63/04; B29C 63/22; B29C 65/00; B29C 65/02; B29C 65/18; B29C 65/24; B29C 65/44; B29C 65/46; B29C 65/48; B29C 65/14; B29C 65/1412; B29C 65/7832; B29C 65/7247; B29C 66/001; B29C 66/00145; B29C 66/05; B29C 66/10; B29C 66/11; B29C 66/1282; B29C 66/2274; B29C 66/2276; B32B 1/00; B32B 7/12; B32B 2323/04; B32B 2323/043
USPC .......................... 156/212, 213, 285, 286, 382
See application file for complete search history.

(56) References Cited

U.S. PATENT DOCUMENTS 4,751,125 A * 6/1988 Ofterdinger .................... 428/68
5,114,514 A * 5/1992 Landis .......................... 156/153
(Continued)

FOREIGN PATENT DOCUMENTS

DE      102 54 957 A1    6/2004
EP      0 262 748 A2     4/1988
(Continued)

OTHER PUBLICATIONS

Merriam-Webster Dictionary, Undercut definition. http://www.merriam-webster.com/dictionary/undercut.*
(Continued)

*Primary Examiner* — Richard Crispino
*Assistant Examiner* — Matthew Hoover
(74) *Attorney, Agent, or Firm* — Oliff PLC

(57) ABSTRACT

A method for coating a preformed core having two faces and an edge around the periphery of the core, which edge links the two faces, includes thermoforming of a polymer material. The coating is formed by the heating, gluing and vacuum application of the two sheets of polymer material which are applied successively to the two faces of the core in order to cover same completely. An automatic machine can be used to carry out the method. The method can be used to produce finished products, in particular surfboards, furniture or display objects.

8 Claims, 7 Drawing Sheets

(51) Int. Cl.
*B32B 37/10* (2006.01)
*B29C 51/16* (2006.01)
*B29C 51/28* (2006.01)
*B29C 63/04* (2006.01)
*B32B 3/04* (2006.01)
*B29C 51/10* (2006.01)
*B29L 31/52* (2006.01)

(56) References Cited

U.S. PATENT DOCUMENTS

| | | |
|---|---|---|
| 5,225,027 A | 7/1993 | Diekwisch |
| 5,728,246 A | 3/1998 | Ewaschuk |
| 2007/0102096 A1* | 5/2007 | Dummett ............... 156/83 |
| 2008/0146102 A1 | 6/2008 | Cheung |

FOREIGN PATENT DOCUMENTS

| | | |
|---|---|---|
| EP | 1 106 331 A1 | 6/2001 |
| FR | 2 674 170 A1 | 9/1992 |
| FR | 2 738 769 A1 | 3/1997 |

OTHER PUBLICATIONS

International Search Report issued in International Patent Application No. PCT/FR2011/000186 dated Aug. 31, 2011 (w/translation).
International Preliminary Report on Patentability issued in International Application No. PCT/FR2011/000186 dated Oct. 2, 2012 (w/translation).
French Written Opinion issued in French Patent Application No. 1001231 dated Dec. 20, 2010 (w/translation).

* cited by examiner

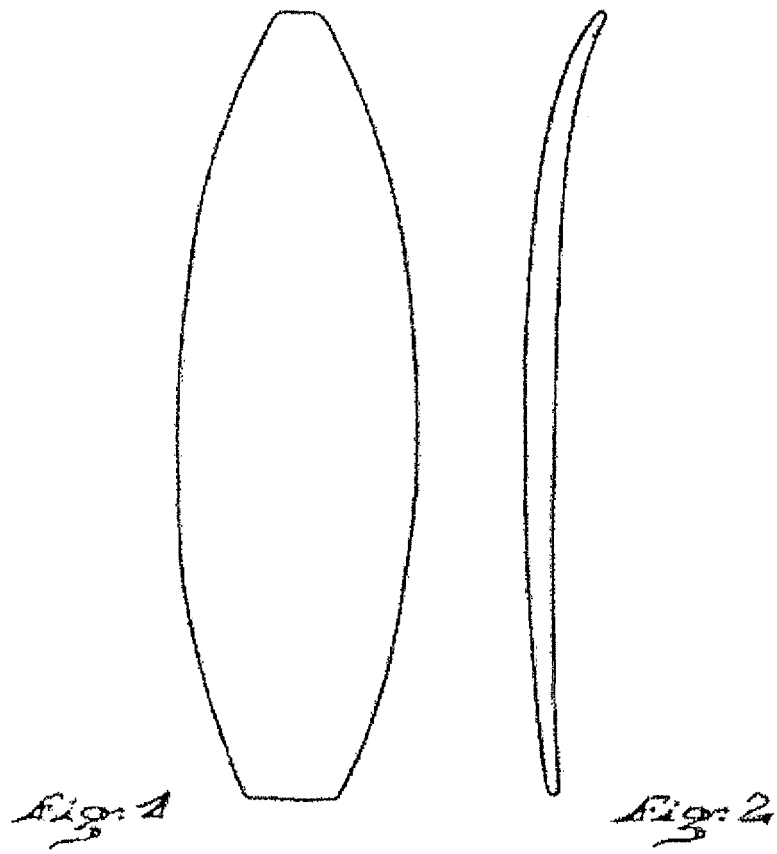
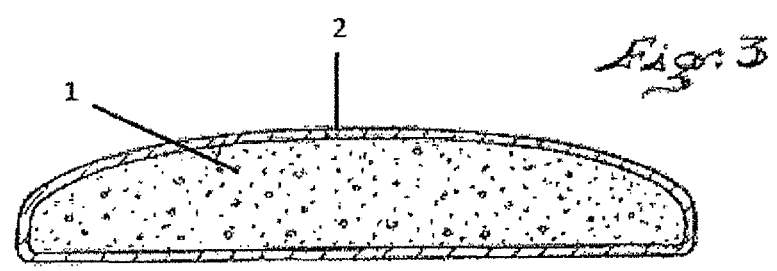

METHOD FOR COATING A CORE OF AN ARBITRARY SHAPE BY THERMOFORMING, AUTOMATIC MACHINE FOR THE IMPLEMENTATION THEREOF AND FINISHED PRODUCT OBTAINED BY SUCH A METHOD

FIELD

The invention relates to the field of the fabrication by an automatic thermoforming method of finished products based on a core of arbitrary shape protected and finished by a polymer material coating layer to reinforce and/or protect and/or decorate the product. The invention applies particularly to sport and leisure products of water sports float type but also to decorative elements, furniture and fittings of the point of sale display or other type.

BACKGROUND

There are numerous classic coating methods utilizing polymer materials to finish products of arbitrary shape.

In the particular field of surfboards, the oldest traditional method is a manual method: the float element with the required shape defined by a core, finished by manual sanding, is coated with an envelope of glass fibers impregnated with polyester or "epoxy" resin, which forms an external reinforcing shell and imparts to the float its final shape. Sanding a layer of pure paraffin-based resin then imparts to the float its final appearance. This traditional craft-oriented method is entirely manual.

The drawbacks of such a technique are that the products used are harmful and impact on working conditions, it takes a very long time and necessitates operatives, having particular qualifications, and finally the exterior shell has very low impact resistance. Moreover, the decoration possibilities are limited.

Industrial methods have therefore been developed for constructing the external shell of a float, either by rotary molding and injection of foam inside the shell formed in this way or by stacking different layers in a mold and press forming using heat and/or a vacuum.

The drawbacks of these industrial techniques are firstly that they necessitate the use of molds and do not allow personalization of the shape of the float, the shape of the external shell depending exclusively on the shape of the mold. Moreover, all boards manufactured in a mold always have a joint plane that is situated at the center of the edge of the board: for practical reasons of extraction from the mold it is impossible to position the joint plane elsewhere. This is the case for example of a board such as that described in patent application US 2008/0146102.

Accordingly, the joint plane of a float is always situated on the contour of the board and in the middle of the edge that is precisely the area most exposed to impact and the joint in the coating at this location makes the boards fragile. Moreover, the edge of the board is an area that is important from the smooth skimming point of view. Positioning the joint here disturbs the skimming of the float over the water. Finally, the joint plane at the center of the edge of the board is not esthetic and is not well thought of by users. Some manufacturers feel obliged to conceal it.

Where the equipment is concerned, the most classic automatic thermoforming methods that use molds to reproduce identical plastic parts (automobile hoods, point of sale displays, domestic appliance parts, food packaging, etc.) can be implemented using commercially available thermoforming machines. At present diaphragm presses enable parts of any type to be shaped, coated with glue and applied, but with no possibility of undercutting.

For arbitrary shapes formed from cores with plane main faces, such as those described in U.S. Pat. No. 5,728,246, for example, particular means have been adopted for covering the edges, which may be either convex or concave: the main teaching is that it is essential to limit the overshoot of the sheet that is to cover the edge, notably to avoid creases: there is never provision for undercutting on the face opposite the face covered mainly by a sheet of polymer material.

Patent application DE 10254957 describes, for the production of furniture or indoor equipment elements, a method of producing panels formed in a vacuum press where a first face is entirely covered with a facing sheet after which the second face and the edge are covered by a second sheet, with the result that finishing is facilitated but the finishing joint line is exactly in the corner formed by the first face and the edge, which the invention seeks to avoid.

SUMMARY

The invention concerns an industrial method that may be automated for coating a preformed core to form an external reinforcing shell by thermoforming and coating with glue polymer sheets, which method is applicable to any shape of core, the thermoforming being effected directly on the part without using a mold.

The coating method used also enables the part to be wrapped with an undercut, thus avoiding a joint plane on the edge because the joint plane may be placed as required at various locations, and in particular on the upper part of the board, which avoids any disturbance to the skimming of the float over the water.

Finally, if industrialized, the method enables a production time saving as well as preserving the possibility of producing shapes that can be personalized.

As will be described in more detail hereinafter, the method of the invention enables the use of materials with greater shock and impact resistance. It also enables digital printing providing a high quality of graphic rendition for decoration. The materials and the method using them are also less harmful for the operatives and the environment.

According to embodiments of the invention, a method of coating a preformed core having two faces and an edge on the perimeter of the core making the connection between these two faces, by thermoforming of a polymer material, the coating being produced by heating, coating with glue and applying in a vacuum two sheets of polymer material applied successively to the two faces of the core to cover the core completely, is characterized in that:

in one step, at least one of the two polymer material sheets, referred to as the first sheet, with an area adapted to cover a complete face of the core, referred to as the first face, the edge of the core and part of the other face of the core, called the second face, is coated with glue and then applied to this first face, the edge and the second face of the core in a vacuum by means enabling undercutting of the edge and this second face, in another step, the other polymer material sheet, referred to as the second sheet, having an area at the least complementary to that of the first sheet so as to cover at least the part of the second face not coverable by the first sheet, is coated with glue and then applied in a vacuum, the order of these two phases of coating with glue and applying two polymer material sheets being of no consequence, and it includes a final finishing step to obtain a joint line outside the edge, on one of the two faces.

In a first embodiment the method is further characterized in that the area of the second polymer material sheet is complementary to that of the first sheet so as to cover the core completely, a joint line being formed at the junction between these two sheets during the final step.

In embodiments, the invention also consists in a coating method of the above kind characterized in that, for a core adapted for a float for water skimming sports, the first face of the core is the face adapted to skim over the water, so that the joint between these two sheets is made, in the final step of the method, on the second face, on the top of the float.

In another embodiment the method is characterized in that the second polymer material sheet has an area adapted at least to cover completely the second face and the edge and is coated with glue and then applied to this second face and to the edge in a vacuum by means enabling undercutting of the edge, the edge thus being covered by the two sheets of polymer material and the joint being formed by overlapping of the two sheets of polymer material.

According to the invention, the method may be carried out either manually or automatically.

The invention also concerns an automatic machine for implementing this method and any finished product obtained by such a method.

In one embodiment of the invention, an automatic machine of the above kind for implementing the method is characterized in that it includes a support adapted to receive the core set down on one of its two faces, the support being set back relative to the edge, a frame and an associated heating system, a displacement system for moving into place the frame adapted to hold a polymer sheet in the heating space of the heating system and then to move away this heated sheet coated with glue and deposit it on the other face of the core by draping it onto the core on releasing it from the frame holding it, the machine further including an elastic membrane clamped around the assembly of the core and the polymer sheet by means of a frame that provides a seal and a vacuum pump for evacuating the air between the assembly and the membrane, thus enabling the sheet to be applied to and held against the core.

In another embodiment of the invention, an automatic machine of the above kind for the automatic implementation of the method is characterized in that it includes a support adapted to receive the core deposited on one of its two faces, the support being set back relative to the edge, a frame adapted to retain fixedly a sheet of polymer material coated with glue, an associated heating system, a displacement system for moving into place the frame adapted to hold the second sheet in the heating space of the heating system and then to move away this heated sheet coated with glue and deposit it on the other face of the core, the heated film being then draped onto the core, the machine further including an inflated bladder adapted to come into contact with the sheet and to apply pressure to the assembly of the core and the heated sheet and a vacuum pump for evacuating the remaining air between the core and the sheet and thereby to stretch the sheet and to press and hold the sheet against the core.

The invention will be better understood and other features will become apparent in the light of the following detailed description given with reference to the appended figures.

BRIEF DESCRIPTION OF THE DRAWINGS

FIGS. 1, 2 and 3 represent in plan view, in side view and in section, respectively, a surfboard produced by the traditional technique (background art).

DETAILED DESCRIPTION OF EMBODIMENTS

FIGS. 1 and 2 represent the traditional shape of a water sports float respectively as seen from above (this view is commonly called the "outline") and from the side (this view is commonly called the "foil" and the "rocker curve"). In the traditional way, as shown in FIG. 3, in which the float is represented in section, the float is produced from a block of foam 1 forming a preformed core covered with a layer 2 of resin reinforced with glass fibers.

The foam block is typically polyurethane foam with a density of 50 kg/m$^3$, but may equally be extruded expanded polystyrene foam. The core may equally have a "sandwich" structure, i.e. be formed of an assembly of layers of different kinds.

The embodiments of the invention described hereinafter may be applied to any type of core.

The method for wrapping a preformed core having two faces and a lateral edge joining those two faces includes thermoforming and direct application to the float of a polymer material in sheet or spool form. The operation is carried out in a plurality of phases, one of which applies to one of the faces of the float and the other of which applies to the other face. The two parts are then joined to strengthen and seal the assembly along a selected line outside the lateral edge of the core.

The sheets or spools of polymer used for this thermoforming and facing typically have a thickness between 0.5 and 2 mm. They may be transparent, colored or opaque.

The polymer materials usable for implementing this method are highly diverse: PVC (polyvinyl chloride), PE (polyethylene), PEHD (high-density polyethylene), high-impact PS (polystyrene), ABS (acrylonitrile butadiene styrene), PET (polyethylene terephthalate), PETG (polyethylene terephthalate glycol), high-impact PMMA (high-impact polymethylmethacrylate), PC (polycarbonate), PA (polyimide), POM (polyoxymethylene), PLA (polyactide) and biopolymers. However, all combinations that may be produced by extrusion (two layers, three layers, etc.), such as the combinations ABS/PU, ABS/PC, PC/PMMA, may also be used, the choice being determined by the mechanical characteristics necessary for the adapted application, its cost, and its other qualities of the coloring and/or decoration possibility type.

Polymers charged with fibers may equally be used, especially when the facing layer must have reinforcing qualities.

Sheets or plates preimpregnated with thermosetting or thermoplastic resin are also compatible with the method of the invention.

This method may be implemented manually but may also be implemented automatically by means of an automatic machine carrying out the various steps.

Figure 4A:
FIGS. 4a, 4b, 4c, 4d, 4e and 4f represent a surfboard in section at various stages of an exemplary method of the invention.
Figure 4:
Figure 4:
Figure 4:
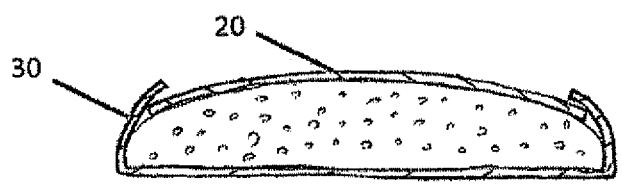
Figure 4:
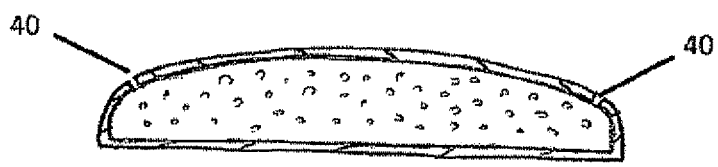
Figure 4:

FIGS. 4a to 4f represent the various steps of the method:

FIG. 4a: Preliminary step of forming the polyurethane foam core 1.

FIG. 4b: Step 1 in which the upper plate 20 previously cut to the exact shape of the contour chosen for this plate is glued in a vacuum onto the upper side of the board, set back from the edge in the example shown.

FIG. 4c: Step 2 of sticking on in a vacuum a plate 30 cut to the shape of the bottom contour with an offset corresponding to the radius of the edges so that it can be raised onto the top of the board and extend beyond the contour of the plate deposited on the upper face.

FIG. 4d: Step 3, during which this perimeter of the lower plate 30 is formed on the edge and on the top of the board to join the upper plate 20.

FIG. 4e: Step 4, in which cutting of the plates in their overlap area and deburring are effected to obtain an edge-to-edge joint 40.

FIG. 4f: Step 5, in which a polymer section is placed and glued over the joint plane to seal and strengthen the assembly, the joint plane 40 thus being produced on the upper face of the core.

Steps 2 and 3 may be interchanged: in this case, it is the plate 20 that comes to bear on the plate 30.

Likewise, the smaller plate may be placed on the lower face of the core.

manually, step 3 is carried out simply by local heating of the projecting plate by means of a heating device and this plate is then pressed onto the edge and onto the top by applying pressure by a backing process using tooling specific to this perimeter.

This succession of steps may be carried out automatically without particular difficulty except for step 3 of coating by the plate or sheet 30, which must cover the edges.

Figure 5A:
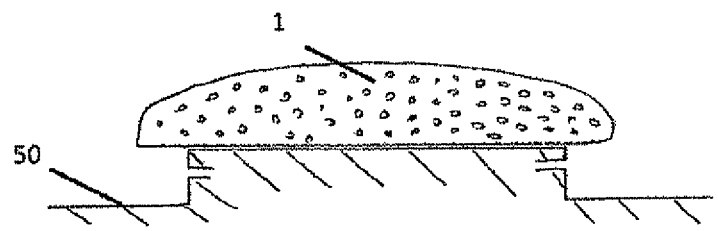
FIGS. 5a, 5b, 5c, 5d, 5e and 5f represent diagrammatically the various phases of an exemplary method of the invention when implemented by an automatic machine, for the steps of coating with glue, application to the second face and covering the edge of the preformed core with an unclamped sheet of polymer material.

This step may be implemented automatically by a machine specifically constructed for this purpose in a first embodiment using an unclamped thermoplastic sheet, in the following manner:

FIG. 5a: The preformed foam slab or core 1 is fixed to a dedicated frame 50 adapted to the shape of this core to free the edge and the lower border.

Figure 5B:
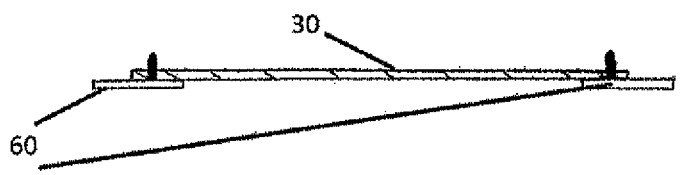

FIG. 5b: The thermoplastic sheet 30 previously coated with glue and of appropriate predetermined thickness is positioned on a frame 60 from which it may be easily released.

Figure 5C:
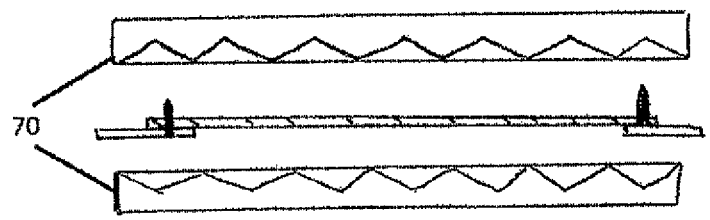

FIG. 5c: Infrared, ceramic or halogen type electric heating panels 70 heat the film on both sides to the forming temperature. This forming temperature varies according to the type of material and the thickness of the sheets used.

Figure 5D:
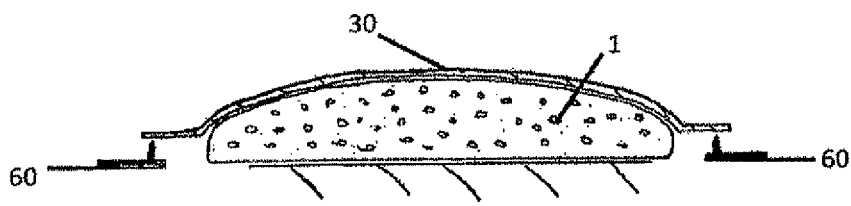

FIG. 5d: After the optimum thermoforming temperature has been reached, the sheet softens. The heating panels 70 are automatically withdrawn and the polymer sheet 30 and the core 1 brought into contact. The heated sheet is then draped onto the foam slab and released from the frame 60 holding it.

Figure 5E:
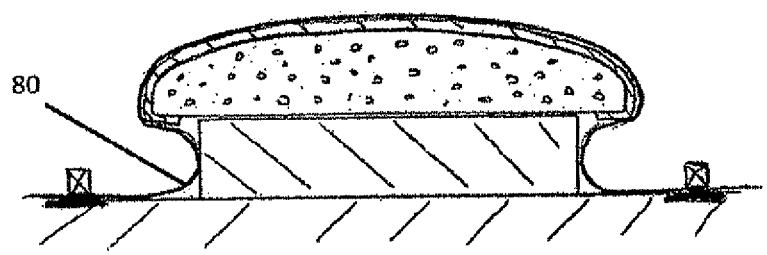

FIG. 5e: A frame containing a clamped elastic membrane 80 is fitted around the assembly of the core 1 and the polymer sheet 30. This frame seals the system.

A vacuum pump is then employed to evacuate the air between the assembly of the core 1 and the polymer sheet 30, on the one hand, and the membrane 80, on the other hand, thus enabling the sheet to be pressed onto and held against the core. The elasticity of the membrane enables the sheet to be applied with an undercut and to wrap around the whole of the edge of the board.

Figure 5F:
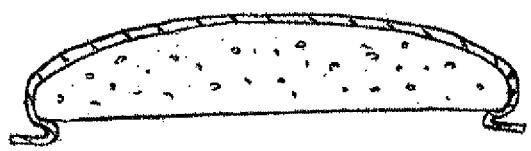

FIG. 5f: The whole is cooled naturally by exposure to the open air and/or with the aid of fans. When the whole has cooled sufficiently, it may be removed from the plate 50 without deforming. The thermoformed parts may then be sent to the finishing shop after the sheet for the other face has been coated with glue and applied.

Figure 6A:
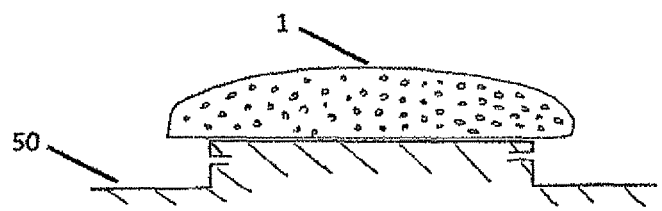
FIGS. 6a, 6b, 6c, 6d, 6e and 6f represent diagrammatically the various phases of an exemplary method of the invention when implemented by an automatic machine for the steps of coating with glue, application to the second face and covering the edge using a clamped sheet of polymer material.

Step 3 may equally be implemented automatically in a second embodiment using a clamped thermoplastic sheet in the manner represented diagrammatically in FIGS. 6a to 6f:

FIG. 6a: The core is fixed to a dedicated frame 50 as before by means of mechanical suckers.

Figure 6B:
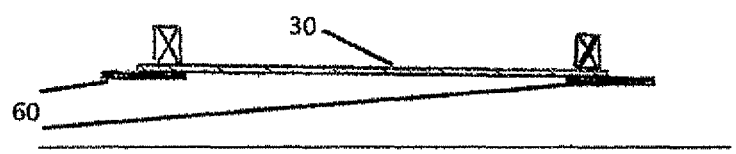

FIG. 6b: The thermoplastic sheet 30 previously coated with glue with a thickness chosen as a function of the material and the required qualities of the coating layer is positioned and then clamped, i.e. held firmly onto a frame 60 that makes the seal with the frame receiving the foam slab.

Figure 6C:
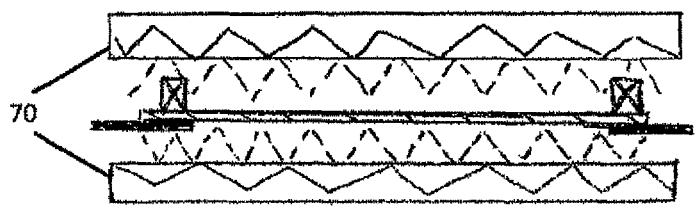

FIG. 6c: As before, infrared, ceramic or halogen type electric heating panels 70 heat both sides of the sheet to the forming temperature. As already indicated, this forming temperature varies according to the materials and the thickness of the sheets used.

Figure 6D:
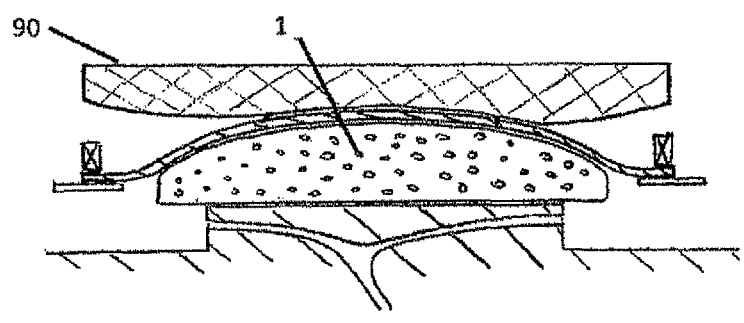

FIG. 6d: After the optimum thermoforming temperature has been reached, the sheet softens. As before, the heating panels are automatically withdrawn and the polymer sheet and the core are brought into contact. The heated sheet 30 is then draped onto the core. At the same time, an inflated bladder 90 comes into contact with the sheet 30 and applies pressure to the assembly comprising the core 1 and the heated sheet 30.

Figure 6E:
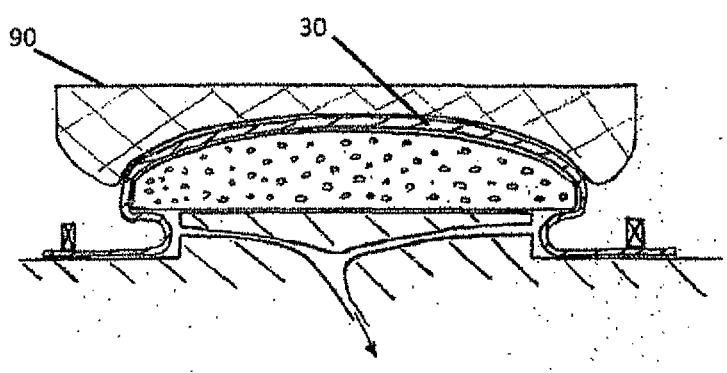

FIG. 6e: A vacuum pump is used to evacuate the remaining air between the core 1 and the sheet 30, thus enabling the sheet to be stretched over, applied to and held against the core.

Stretching the sheet enables it to be undercut and to wrap around the whole of the edge of the board. The bladder continues to be pressed onto the core/polymer sheet assembly.

Figure 6F:
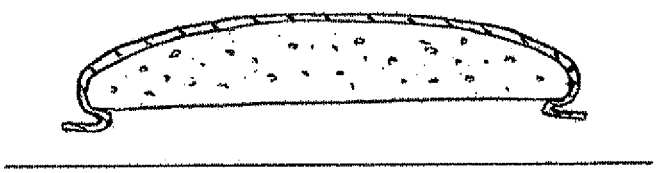

FIG. 6f: The whole is then cooled naturally by exposure to the open air and/or with the aid of fans. When the whole has cooled sufficiently, it may be removed from the plate without deforming. The thermoformed parts may then be sent to the finishing shop after the sheet for the other face has been coated with glue and applied.

Figure 7A:
FIGS. 7a, 7b and 7c represent the resulting finished products diagrammatically in section.
Figure 7B:

The method used allows undercutting and thus allows the joint to be placed at the required location by simple overlapping, as represented in FIG. 7a in which the two surfaces overlap on the upper surface and in FIG. 7b in which the two surfaces overlap on the lower surface.

When the two sheets of polymer material overlap, each of them covering one face completely and being applied to the edge and possibly to part of the other face by the method of the invention which allows undercutting, the double facing helps to stiffen, strengthen and seal the core, particularly in the area of the edge.

Figure 7C:

As represented in FIG. 7c, the method used also enables the finishing step to be carried out using a preformed polymer material seal 40 that completes the seal by edge-to-edge gluing between the two glued and pressed sheets.

This method is particularly suitable for boards for water skimming sports (kitesurfing, wakeboarding, windsurfing, board sports, etc.) and more particularly for surfboards.

However, this method may also be applied to the field of furniture and decoration, in particular to place a joint plane or line between plates or sheets covering a core elsewhere than at the corners or an edge and/or at locations determined to induce no defects in operation and/or to make the joint invisible.

The invention claimed is:

1. A method of coating a preformed core having a first face and a second face, the method comprising:
   applying a first polymer material sheet coated with glue and having an area adapted to completely cover the first face of the preformed core, an edge on the perimeter of the preformed core and part of the second face of the preformed core, to the first face, the edge and the second face of the preformed core in a vacuum so as to undercut the edge and the second face,
   applying, in a vacuum, a second polymer material sheet coated with glue and having an area at the least complementary to that of the first polymer material sheet so as to cover at least the part of the second face not coverable by the first polymer material sheet,
   the order of applying the first and second polymer material sheets being of no consequence, and
   forming a joint line, outside all edges between the first and second faces, on one of the first and second faces, wherein
      edges of the first polymer material sheet and the second polymer material sheet overlap with each other at an overlap area before forming the joint line, and
      the joint line is formed by cutting and deburring the first polymer material sheet and the second polymer material sheet in the overlap area.

2. The method as claimed in claim 1, wherein the area of the second polymer material sheet is complementary to that of the first polymer material sheet to cover the preformed core completely, the joint line being formed at the junction between the first and second polymer material sheets.

3. The coating method as claimed in claim 1, wherein, for a preformed core adapted for a float for water skimming sports, the first face of the preformed core is a face adapted to skim over the water, so that the joint line between the first and second polymer material sheets is formed on the second face, on the top of the float.

4. The method as claimed in claim 1, wherein the second polymer material sheet has an area adapted at least to cover completely the second face and the edge and is coated with glue and then applied to this second face and to the edge in a vacuum so as to undercut the edge, the edge being covered by the first and second polymer material sheets and the joint line being formed by overlapping of the first and second polymer material sheets.

5. The coating method as claimed in claim 1, wherein the method is carried out manually, the first and second polymer material sheets being cut according to areas to be glued before coating with glue.

6. The coating method as claimed in claim 1, wherein the method is carried out by an automatic machine, the first and second polymer material sheets being coated with glue, applied and then cut along the joint line.

7. The coating method as claimed in claim 1, wherein the first face and the second face are planar faces in their entirety.

8. The coating method as claimed in claim 7, wherein the coated preformed core is a float for water skimming sports.

* * * * *